Feb. 28, 1961 F. E. DADDARIO 2,972,958
PUMPING UNIT
Filed Dec. 31, 1952 2 Sheets-Sheet 1

Inventor:
Francis E. Daddario,
by
Attorney

Feb. 28, 1961 F. E. DADDARIO 2,972,958
PUMPING UNIT

Filed Dec. 31, 1952 2 Sheets-Sheet 2

Inventor:
Francis E. Daddario,
by Albert Spera
Attorney

United States Patent Office 2,972,958
Patented Feb. 28, 1961

2,972,958

PUMPING UNIT

Francis E. Daddario, Reading, Mass.
(1418 Commonwealth Ave., Newton, Mass.)

Filed Dec. 31, 1952, Ser. No. 328,939

1 Claim. (Cl. 103—113)

This invention relates to pumping units particularly adapted for use where liquid is to be delivered at intervals and where constant service is required under conditions such that safeguards against loss of priming are desired.

In water systems, for example, pump operations are determined by consumption, and in many installations, the pumps of such systems lose their priming often enough, between periods of use, to present a problem.

Various self-priming pumps have been proposed. One type of such a pump that has proved effective consists of a pump primed by a predetermined liquid head in a tank and having a conduit effecting communication between its outlet and the upper part of the tank so that, when the pump is in operation, liquid is pumped from the lower part of the tank to the upper part thereof. In that conduit and located above the pump, there is an injector provided with a suction tube in communication with the liquid source so that the circulation of liquid by the constantly primed pump is effective to draw liquid from the source and deliver it into the tank which is provided with a discharge conduit for excess liquid.

In accordance with the invention, a pumping unit is provided that includes a self-primed pump of the type above referred to with the suction tube of its injector being in priming communication with a second pump whose inlet is connected to the liquid source. This enables the operation of the self-primed pump to effect the priming of the second pump whose action is direct and which has a discharge conduit that usually is connected to the discharge conduit of the tank.

In the accompanying drawings, there are shown illustrative embodiments of the invention from which its several novel features and advantages will be readily apparent.

Figure 3:
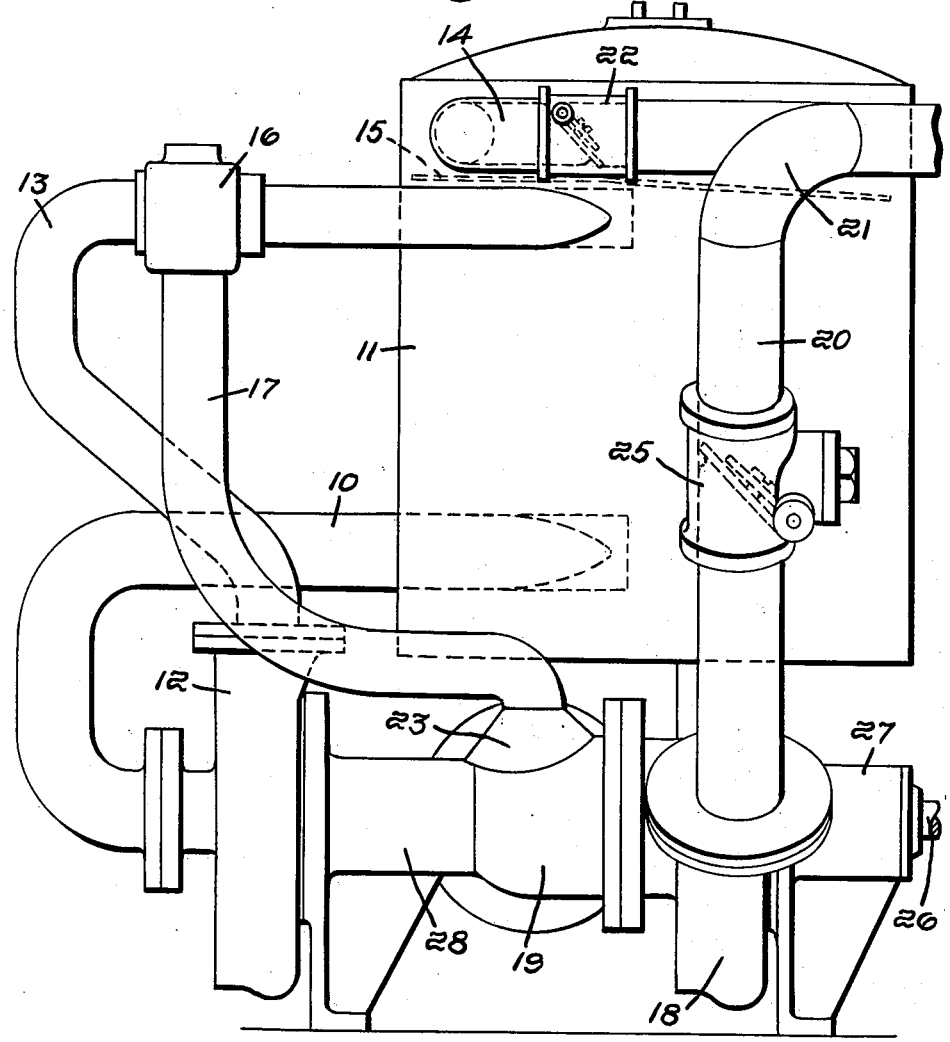
Fig. 3 is a view, generally similar to Fig. 1, showing another embodiment of the invention.

In the embodiments of the invention shown in the drawings, a conduit 10 effects communication between the lower part of the tank 11 and the inlet side of the pump 12 which is so located as to be maintained primed by the tank contents. A conduit 13 effects communication between the outlet of the pump 12 and the upper part of the tank 11. Between the discharge end of the conduit 13 and the tank discharge conduit 14, there is a baffle 15. Preferably, the connection of the conduit 10 is on the side of the tank 11 opposite the connection of the conduit 13 therewith and both such connections are tangential as will be apparent from Figs. 1 and 3.

When the pump 12 is running, the tank contents are circulated from the bottom part of the tank 11 to the upper part thereof. Located in the conduit 13 above the pump 12 is the head 16 of an injector so disposed that liquid from the source is drawn by the circulating tank contents through the suction tube 17 of the injector.

Figure 1:
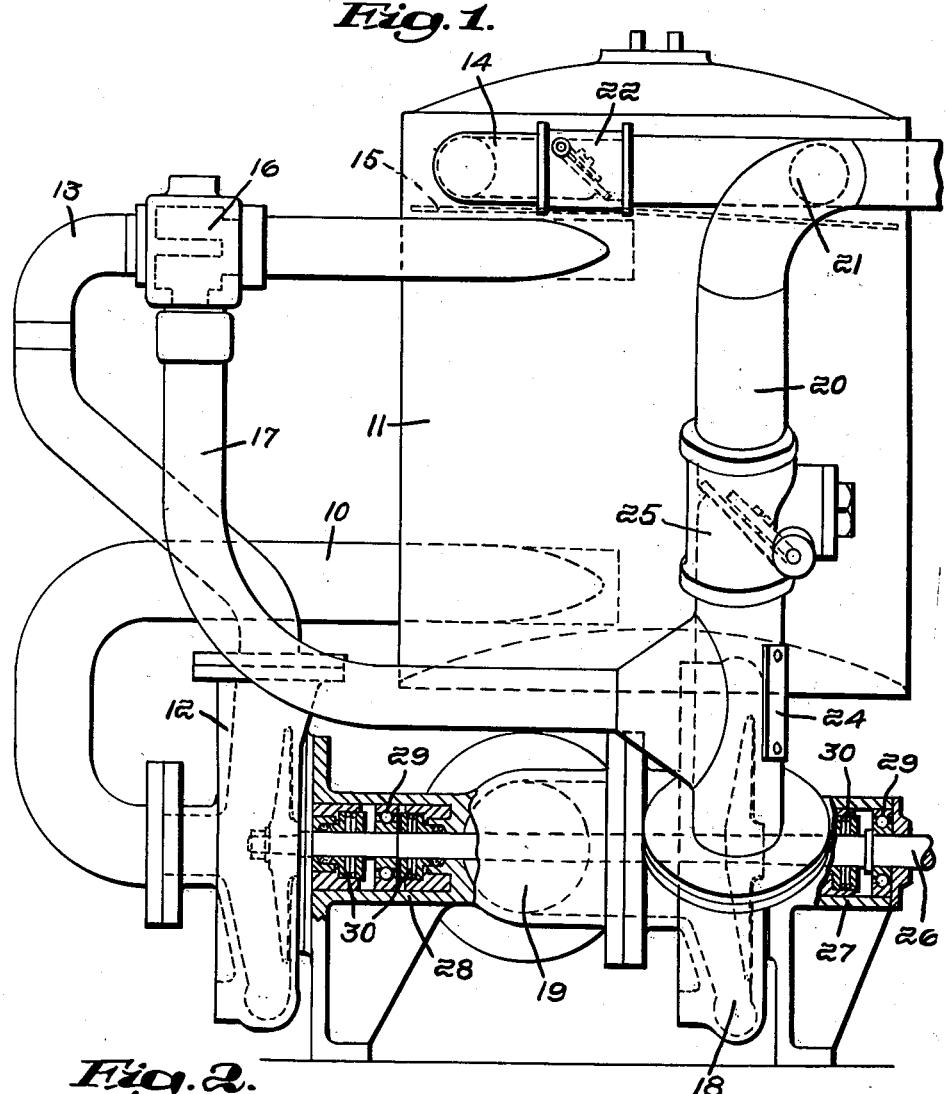
Fig. 1 is a partly sectional view, in elevation, of a pumping unit in accordance with the invention.
Figure 2:
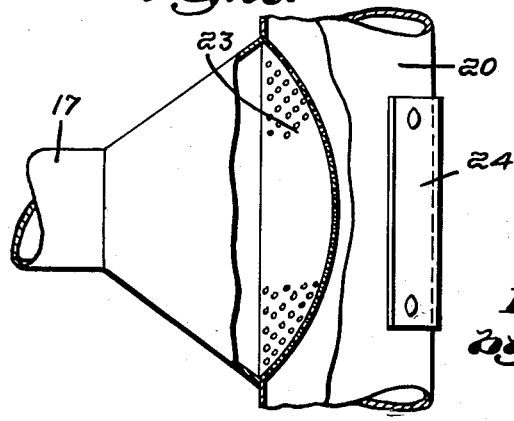
Fig. 2 is a partly sectional fragmentary view showing the strainer at the junction of the suction tube and the discharge conduit of the second or direct discharge pump.

The suction tube 17 is in priming communication with a second pump 18 whose inlet 19 is to be connected to the well or other source of the liquid. The pump 18 is provided with a discharge conduit 20 that is usually connected to the tank discharge conduit 14 as at 21. Preferably a check valve 22 is employed between the joint 21 and the tank 11. The suction tube 17 may be connected directly to the inlet 19 of the pump 18 as suggested in Fig. 3 or it may be connected to the discharge conduit 20 as shown in Figs. 1 and 2. In either case, the intake end of the suction tube 17 is protected by a screen 23 accessible through a cleanout door 24, in Figs. 1 and 2.

Each pumping unit in accordance with the invention has its discharge conduit 20 provided with a valve 25 to enable that conduit to be closed when its pump 18 is being primed by the suction created by the liquid circulated by the pump 12. While the valves 25 may be of any type, the use of self-closing check valves is preferred.

The pumps 12 and 18 are for convenience shown as being both driven by the shaft 26 and are connected to a base consisting of a section 27 and a section 28, which includes the pump inlet 19 and to one end of which the pump 12 is attached. The pump 18 is secured between the base sections 27 and 28 which are chambered to receive shaft supporting bearing units 29 and shaft seals 30.

Pumping units in accordance with the invention are well adapted to meet the requirements of liquid pumping where intermittent service and other conditions make it necessary to safeguard against loss of priming. This results because the pumping units combine the advantages and eliminate the disadvantages of a direct discharge pump with those of a pump that is positively primed but whose pumping effect on the source is through the suction tube of an injector.

What I therefore claim and desire to secure by Letters Patent is:

In pumping apparatus, the combination of a tank having an outlet, a first pump disposed with its inlet in communication with the tank contents thereby to be primed by the head thereof, a connection between the outlet of said first pump and the upper part of said tank, and a suction producing device of the jet type located in said connection above said first pump and including a suction tube, and a second pump including an inlet and a valve controlled outlet, said suction tube being in priming communication with said second pump, said second pump outlet being connected to the outlet of said tank, and a valve in said tank outlet between said tank and its connection with the second pump outlet.

References Cited in the file of this patent

UNITED STATES PATENTS

| 790,702 | Nash | May 23, 1905 |
| 1,440,808 | Wineman | Jan. 2, 1923 |
| 2,553,066 | Southern | May 15, 1951 |

FOREIGN PATENTS

| 20,280 | Great Britain | of 1909 |
| 25,988 | Great Britain | of 1898 |
| 463,338 | France | Oct. 7, 1913 |
| 601,653 | Great Britain | May 11, 1948 |